United States Patent [19]

Lilov

[11] 3,962,473
[45] June 8, 1976

[54] METHOD OF MAKING CRUST LIQUEURS BY ANNULAR FLOW COOLING OF THE HOT AQUEOUS FILLING LIQUID

[75] Inventor: Dimitre Lilov, Milan, Italy

[73] Assignee: P. Ferrero & C. S.p.A., Alba (Cunea), Italy

[22] Filed: Oct. 25, 1973

[21] Appl. No.: 409,542

[30] Foreign Application Priority Data
Oct. 26, 1972 Italy .................................. 70375/72
Dec. 27, 1972 Italy .................................. 71089/72

[52] U.S. Cl. .................................. 426/282; 62/68; 62/342; 426/515; 426/519; 426/524; 426/572; 426/660
[51] Int. Cl.² .................................. A23G 3/20
[58] Field of Search ............. 426/89, 103, 214, 282, 426/306, 380, 515, 519, 524, 572, 659, 660; 62/68, 69, 342, 343

[56] References Cited
UNITED STATES PATENTS

| | | |
|---|---|---|
| 2,013,018 | 9/1934 | Vogt .............................. 62/342 UX |
| 2,013,025 | 9/1935 | Bottoms et al. ................. 426/519 X |
| 2,206,419 | 7/1940 | Miller ............................. 426/519 X |
| 3,496,886 | 2/1970 | Fuhr ................................... 426/380 |
| 3,795,748 | 3/1974 | Cillario ............................. 426/282 |

*Primary Examiner*—S. Leon Bashore
*Assistant Examiner*—Steve Alvo
*Attorney, Agent, or Firm*—Sughrue, Rothwell, Mion, Zinn & Macpeak

[57] ABSTRACT

A process of making crust liqueurs by producing a hot aqueous filling liquid, cooling and thereby supersaturating said liquid in the presence of stirring and friction by continuous sweeping an annular flow of said liquid on a cooled smooth surface, depositing the cooled liquid into preformed chocolate shells and closing said shells. The cooling step is conveniently performed by use of a conventional swept surface heat exchanger and the temperature of cooled liquid may range preferably from +5° to −10°C. Subjecting the green chocolate candies to a conditioning step, preferably between 10° − 20°C, most preferably around 15°C improves the desirable properties of the crust.

9 Claims, 3 Drawing Figures

METHOD OF MAKING CRUST LIQUEURS BY ANNULAR FLOW COOLING OF THE HOT AQUEOUS FILLING LIQUID

This invention relates to a method of making crust liqueurs by producing a hot aqueous sugar solution, optionally with addition of flavoring substances, cooling the hot solution below the melting point of chocolate whereby a supersaturation of the solution is effected, depositing the supersaturated solution into preformed chocolate shells and sealing the shells with a chocolate cover.

The term "crust liqueurs" as used herein includes chocolate candies having a liquid filling with a sugar crust. The crust is intended to separate the liquid filling from the chocolate shell so that an erosion or other attack of the shell by the filling will not occur on standing.

The term "supersaturated sugar solution" as used herein designates solutions in which the quantity of dissolved sugar exceeds (preferably by an appreciable amount) normal solubility.

The aqueous sugar solution usually contains a flavoring substance. The flavoring substance may be alcoholic or non-alcoholic. So cognac or brandy are typical alcoholic flavors whereas coffee extract is an example of a non-alcoholic flavoring substance.

Processes for the production of crust liqueurs are known in the art. A prior art of making crust liqueurs is the well-known so called "Mogul process."

A more recent different development typically starts with admixing the filling components at an elevated temperature, cooling the filling liquid below the melting point of the chocolate and thereby supersaturating the filling liquid. The cool, supersaturated liquid is then deposited into chocolate shells which are closed thereafter. Such process is disclosed by Fohr in the Italian Pat. No. 884,339 (corresponding patents are, for instance, French Pat. No. 1,556,275; British Pat. No. 1,172,417; U.S. Pat. No. 3,496,886 and German application DAS No. 1,692,360), wherein the necessary supersaturated sugar solution is exactly prepared by quick cooling (at least 20°C/second). The cited German DAS makes clear that the quick cooling shall be effected in the absence of stirring, the absence of mechanical handling like stirring being strongly recommended also when depositing or filling the resulting supersaturated solution into the preformed shells.

It is known that during cooling, i.e., while supersaturating the so-called "graining," that is, a premature crystallization of the excess sugar may occur. In order to reduce the risk of graining the prior art had suggested to avoid stirring ("Confectionery Production," August 1964, page 636) or to chill rapidly (H. R. Jensen, "Chemistry, Flavouring and Manufacture of Chocolate Confectionery and Cocoa" 1931, page 241).

The prior art further teaches that a supersaturated sugar solution, such as of the type employed for manufacturing crust liqueurs, is extremely sensitive to friction. For this reason, the above mentioned Italian patent suggests depositing the supersaturated solution into the chocolate shells by gravity instead of by the usual depositing apparatus with piston pumps. In order to avoid friction due to mutually sliding surfaces, British Pat. No. 956.933 suggests depositing supersaturated sugar solutions by means of a special depositing apparatus provided with a diaphragm pump. Finally it is objectively known (compare also the above mentioned literature by H. R. Jensen) that beating a supersaturated sugar solution forms the fondant, that is, a mass in which the supersaturation sugar has separated in the form of tiny crystals.

It is obvious to one skilled in the art that the above technical prejudices entail in actual practice considerable drawbacks. Thus, for instance, it is clear that a considerable batch of sugar solution cannot be cooled without stirring at a rate of at least 20°C/sec. as suggested by the above mentioned Italian patent. It is true that a continuous process can be carried out in the manner described in the said patent, by causing the solution to flow by gravity over cooled surfaces; however, since the viscosity of the solution rapidly increases on cooling, flow is very slow. This results in the impossibility of reaching high degrees of supersaturation; on the other hand, a specific output (liters of supersaturated solution per hour and square meter of cooling surfaces) is very low.

Aqueous sugar solutions intended for the manufacture of crust liqueurs typically exhibit a saturation point between about 40°C and about 55°C. The above mentioned Italian Pat. No. 884,339 suggests cooling such a solution to "as low a temperature as possible," for which the patent specification indicates a value of 26°–28°C. According to the patent, at the just mentioned temperature the solution is said to be still fluid enough for subsequent depositing by gravity into the preformed chocolate shells. Though this is true, it is just as true that at temperatures below 26°–28°C the solution in question hardly flows by gravity over the cooling surfaces. Therefore, no high supersaturations can be reached.

It is an object of the present invention to provide a convenient process of making crust liqueurs wherein filling liquids may be cooled and thereby highly supersaturated and deposited into the chocolate shells without any risk of graining. It is a further object of the invention to provide a process of making crust liqueurs wherein the cooling step may be performed with a commercially acceptable output.

It is still a further object of the invention to provide a process for making crust liqueurs having an improved crust.

It has now been found that directly in contrast with all the above mentioned prejudices a hot aqueous sugar solution for use in crust liqueur making can be supersaturated by cooling in the presence of stirring and friction, at a cooling rate °C/sec. which may be even relatively low and does not in any case compel the expert to employ extensive heat-exchange surfaces when a commercially acceptable output is desired.

More particularly a method of making crust liqueurs has been developed of the type as initially mentioned by causing the hot sugar solution to flow in the form of an annular flow from an inlet end to the outlet end of a cooled smooth tubular surface surrounding said flow in contacting relationship thereto, sweeping at the same time in a cicumferential direction and in a continuous manner said surface and positively confining from the inside said annular flow, then depositing the cooled supersaturated filling discharged at the said outlet end into the chocolate shells and sealing the shells.

Preferably, the said tubular surface is circumferentially swept by distinct annular zones in a cyclic sequence.

Moreover, preferably, said annular flow is substantially exclusively produced by a hydraulic head or pressure of the solution flowing into the inlet end of the tubular surface.

Furthermore, preferably, the said tubular surface is swept at foaming speed. The term "foaming speed" as used herein should be understood to mean that, by reproducing this process in the presence of air, the product discharged at the outlet end of the tubular surface consists of an air dispersion in the sugar solution, that is, a foam, having a half-life at rest of not less than 30 seconds. Sweeping the surface at the foaming speed further contributes towards efficiently dispersing the liquid film in contact with the said tubular surface into the liquid body, and replacing it by a fresh film.

When high supersaturations are required, the process as defined above can be repeated with the use of a further tubular surface, maintained at a temperature and/or swept at a foaming speed which advantageously are below those employed in connection with the first tubular surface. In other words, the process according to this invention can be carried out by a plurality of steps, one or more steps following the first step being preferably operated at a temperature and/or a sweeping speed below those of the first step.

One secondary feature of the instant process therefore resides in cooling the solution by 20°C at least, below its saturation point and below the melting point of chocolate; preferably, the solution is cooled to a temperature from +5°C to −10°C and deposited at this temperature into the preformed shells. At these temperatures the liquid employed for crust liqueurs is practically not subject to any graining risk contrarily to an identical solution, however, at a temperature of the order of 15°–25°C. This fact too is a considerable advantage of the instant process over the prior art known heretofore.

Depositing of the cool, supersaturated solution can be effected by gravity through nozzles controlled by intercepting means. On account of the high viscosity of the solution at the preferred temperature of +5°C to −10°C, flow through the nozzles can be promoted by a compressed gas medium in the depositing machine tank. However, since the solution at this temperature does not exhibit any tendency to graining, not even in the presence of the friction, a piston-type depositing machine of conventional design is preferably employed for depositing, wherein the nozzles are each fed by a piston pump drawing the solution from the depositing machine tank and delivering it through the nozzle, beneath which the shell to be filled is situated.

The shell may be sealed by a chocolate cover in the usual manner, known in the manufacture of filled chocolate candies. However, preferably first a thin layer of molten chocolate is sprayed onto the free surface of the dose of solution in the shell, the chocolate promptly hardening in contact with the solution, whereupon the shell is sealed by a chocolate mass forming the cover.

It has been noted that the formation of a very compact, finely crystalline sugar crust may be enhanced when the sealed "green" chocolate candies are subjected to subsequent conditioning, i.e. a control of the warming-up rate of the candies. Advantageously the conditioning is effected at a temperature and during a period of time sufficient for separating the sugar in form of a crust on the inner surfaces of the shell and cover.

The conditioning temperature is preferably of from +10° to +20°C. A most preferred conditioning temperature is around 15°C. However, it should be noted that the conditioning temperature within the afore-mentioned range must not necessarily be kept constant during conditioning. It is further pointed out that, although the presence of a conditioning step is preferred, the present process may also be carried out without a conditioning step.

According to the present understanding of the invention the sugar crust does not form directly after sealing of the crust liqueurs. In fact, crystal germs first form in the dose of solution enclosed in the "green" chocolate candy, said germs preferentially forming at the contact interface of the solution and chocolate. Only after a sufficient progress of this nucleating step, which takes 1 hour or more, formation of the crystals becomes visible. In carrying out the invention the green chocolates may therefore first conveniently be caused to travel through a packing station, and packages containing the chocolate candies may immediately be stored in a compartment maintained at 10°–20°C, preferably about 15°C, in which formation of the crust takes place. In order to obtain a uniform crust the boxes are turned upside down from time to time, such as every 8 − 12 hours. Formation of the crust is practically complete after about 48 hours, whereafter the chocolate candies can be distributed to the trade.

In the following the cooling step in making crust liqueurs is discussed more in detail.

The cooling step in the process can be performed by employing for cooling an appropriate swept surface heat exchanger. However, the usefulness of a swept surface heat exchanger for supersaturating sugar solution has not been disclosed before and it is a surprising aspect of the present invention that appropriate but otherwise conventional swept surface heat exchangers are useful for this specific aspect without any occurence of graining.

A swept surface heat exchanger for carrying out the present process comprises a cylindrical heat exchange barrel in combination with (a) a substantially cylindrical rotor coaxial with the barrel within the latter capable of radially confining from the inside the annular axial flow of the liquid to be cooled in contact with the inner barrel surface, and (b) wiper blades carried by the rotor for sweeping said inner barrel surface during rotation of the rotor. The wiper blades are preferably hinged to the rotor along generatrices of the latter and the sweeping contact with the barrel is produced by the centrifugal force acting on the blades. In operation the axial flow of liquid filling the annular clearance between the barrel and rotor is therefore subjected to rubbing of the blades on the inner barrel surface and is continuously mixed by the sweeping action of the blades.

The cooling step of the process according to the invention may therefore be briefly defined as continuously causing the said solution to flow through an appropriate swept surface heat exchanger or through a plurality of such exchangers connected in series, while the barrel of the heat exchanger is being cooled. It is preferred as aforementioned that the tubular surface is swept circumferentially by distinct annular zones in a cyclic sequence. That means, as will be further described hereafter, that the wiper blades are staggered both in axial and in circumferential direction.

Moreover said annular flow, considered as a whole, is preferably not subjected to any propelling pressure due to the wiper blade arrangement on the rotor. To this end, as aforesaid, the annular flow is substantially exclusively produced by the hydraulic head of the hot solution flowing to the inlet end of the barrel.

The process of crust liqueur making and the specific use of the swept surface heat exchanger will become more apparent to those skilled in the art from the following description with reference to the accompanying drawings wherein FIG. 1 is a plan view of an apparatus for carrying out the cooling step of the process;

Figure 1:
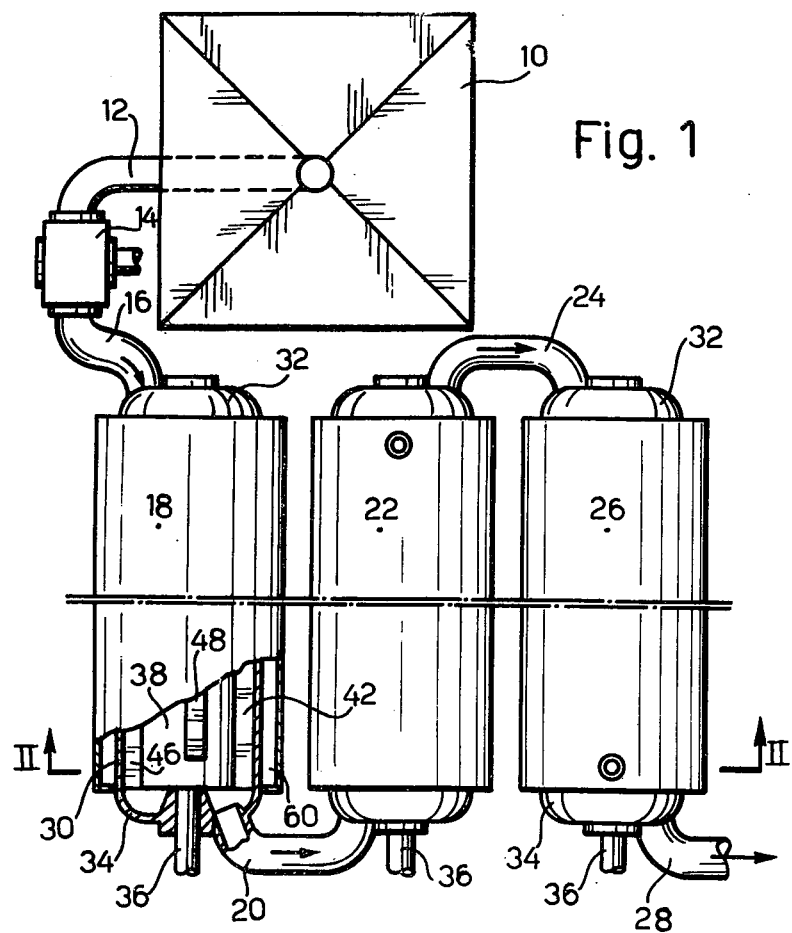

On the drawings 10 denotes a charging hopper for the solution to be cooled. The lowest point of the hopper bottom is connected by a tube 12 with a gear pump 14 which feeds the solution through a pipe 16, at a predetermined hourly feed rate, to the inlet end of a first heat exchanger 18, the outlet end of which is connected by a tube 20 with the inlet end of a further heat exchanger 22 similar to the heat exchanger 18. The heat exchanger 22 in turn discharges the solution through a tube 24 to the inlet end of a third similar exchanger, denoted by 26, the outlet conduit 28 of which delivers the definitely cooled supersaturated solution.

The exchangers 18, 22, 26 each comprise a circular-cylindrical barrel 30 of stainless steel sheet. The inner surface 30A of the barrel is polished and is, for instance, 156 mm in diameter and 530 mm in length. The barrel 30 is closed at both ends by cupped covers 32, 34 carrying bearings for a shaft 36 driven at adjustable speed by a non-illustrated electric motor. A cylindrical rotor 38 is keyed to the shaft 36 and equals in length the barrel 30, the rotor diameter being, for instance, 126 mm, so that an annular clearance 40 of a radial depth of 15 mm is formed between the rotor and barrel. The inlet and outlet tubes, such (as those denoted by 16 and 20 in connection with the exchanger 18) open into their respective covers 32, 34.

Figure 3:
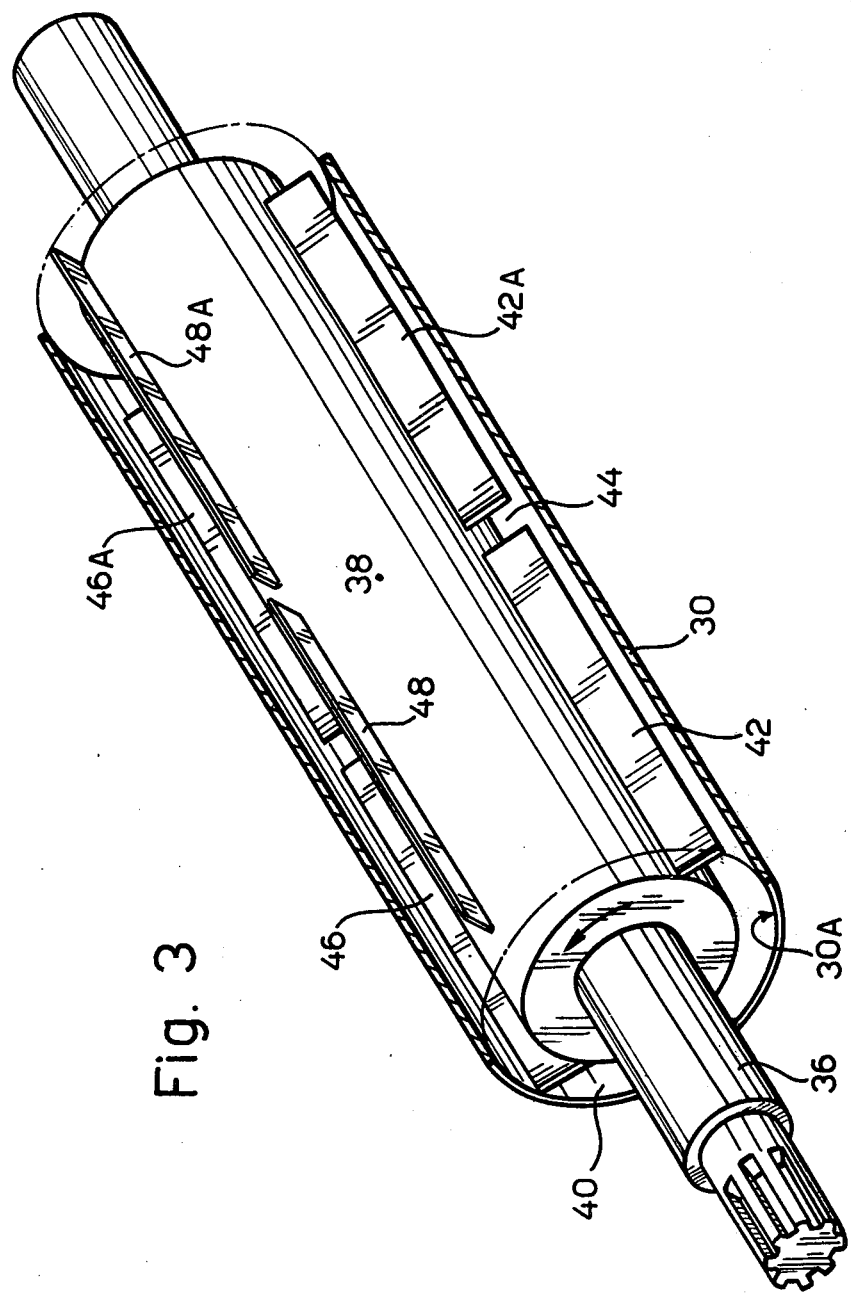
FIG. 3 is a part sectional perspective view of one of the heat exchangers shown in FIG. 1.

Two rectilinear wiper blades 42, 42A (FIG. 3) are hinged (in any suitable manner) to the rotor 38 along a common generatrix of its circumferential surface. Each blade is, for instance, 220 mm in length and 35 - 38 mm in width. The blades are inclined so that, seen in the direction of rotation of the rotor the longitudinal free edge of a blade lags with respect to the rotor-hinged edge. The blade 42 substantially adjoins in longitudinal direction one rotor end, and is followed by a gap 44 of 5 - 10 mm, followed in turn by the blade 42A which therefore ends a distance apart from its respective rotor end. Two further blades 46, 46A are arranged in the same manner as described above, along a generatrix diametrically opposite the first mentioned generatrix.

Figure 2:
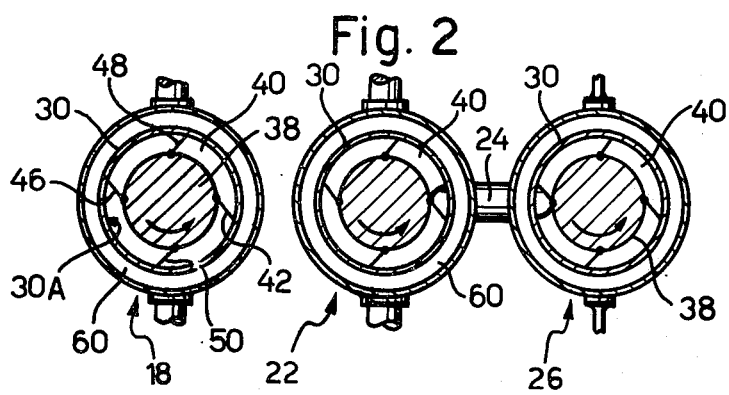
FIG. 2 is a fragmentary cross sectional view on line II—II of FIG. 1.

Two further blades 48, 48A, identical with the former and identically inclined are arranged along a third generatrix offset through 90° to the first two mentioned generatrices. However, the blades 48, 48A are axially arranged inversely to the blades 42, 42A and 46, 46A. Finally, two blades (50, 50A) not visible in FIG. 3 and the blade 50 only of which is visible in FIG. 2 are arranged diametrically opposite the blades 48, 48A on the rotor, the blades 50, 50A being similarly distributed as the blades 48, 48A. The thickness of the blades is about 3 mm. On rotation of the rotor, the free longitudinal edges of the blades are urged by the centrifugal force against the inner surface 30A of the barrel 30. With the arrangement shown on the drawing, the blade pairs each sweep two distinct annular zones of the surface 30A, the non-swept intermediate regions being swept by the next blade pair, all in a cyclic sequence, so that the annular zones swept at each cycle (in the specific case half turn of the rotor) substantially cover the whole surface 30A. Preferably, the said surface is entirely swept at each cycle, so as to steadily renew the liquid layer in contact with the said surface. However, it was ascertained that the end result is unaffected when the surface 30A is swept over 75 - 80% only if its length. More particularly, the barrel 30 can protrude for instance by 5% of its length, beyond each one of the two ends of the rotor 38, should this extension be found convenient for the sake of a uniform liquid inflow to the clearance 40 and a just as uniform outflow therefrom. In normal operation the sugar solution to be cooled fully fills the annular clearance 40. The regions left free by the blades situated along the same generatrix of the rotor prevent the liquid filling the four quadrants of the clearance 40 from rotating as a compact body together with the rotor, instead of undergoing substantial intermixing.

The barrel 30 is surrounded by a cooling jacket 60. In the specific embodiment shown on the drawing, the jackets of the first two heat exchangers 18, 22 are fed with cold water; the jacket of the third heat exchanger 26 is fed with a refrigerating fluid, typically "Freon" (chlorine-fluorine substituted hydro-carbons), in order to cool the sugar solution down to 0°C and even −10°C.

Heat exchangers of the above described type are manufactured for instance, by the St.Regis Company, Division of Creamery Package Mfg. Co. for pasteurization of milk and preparation of icecream.

In the following Example 1 the cooling step of a hot sugar solution is disclosed in detail whereas Example 2 refers to a preferred embodiment of the present process of crust liqueur making.

EXAMPLE 1

A sugar solution suitable for manufacturing crust liqueurs is prepared in a known manner from sucrose, water and Cognac. The solution is at a temperature of 60°C and is of the following composition by weight:

| | |
|---|---|
| sucrose | 64% |
| water | 21% |
| ethyl alcohol | 15% |

Its saturation point is about 50°C.

The heat exchangers 18, 22, 26 are started, the jackets 60 of the two first mentioned ones being fed with cool water (about 15°C) and the jacket of the third mentioned heat exchanger being fed with Freon, the rotors 38 of the first two heat exchangers and the rotor of the third heat exchanger being rotated at 400 r.p.m. and 200 r.p.m., respectively.

It should be noted that the annular clearances 40 contain air at this stage.

The solution prepared as above is poured into the hopper 10, then pumped by the pump 14 at a delivery rate of 110 liters/hour. The temperatures of the solution at the outlet from the heat exchangers 18, 22 und 26 soon stabilize at 32°C, 20°C and −1°C, respectively.

On taking at this stage samples of the liquid issuing from the said heat exchangers, they are each found to consist of an extremely fine air dispersion in the sugar solution which is of a turbid aspect leading to believe that graining has occurred. By allowing the samples to rest in their respective glass beakers at their respective temperatures, the turbidity is seen to decant upwards leaving as a "heavy phase" a perfectly clear solution. In every case the vertical extension of the turbid zone reduces by one half in a period exceeding 30 seconds; in the sample taken from the delivery tube 28 the half-life time amounts to almost 1 hour.

On further feeding the solution, from the hopper 10, the air is thoroughly driven away and a highly viscous (viscosity about 3400 centistokes) clear supersaturated solution is obtained from tube 28, suitable for handling without any special precaution. The cooling rate in the devices 18, 22, 26 is found to be 0.155°C/sec., 0.104°C/sec and 0.180°C/sec., respectively. This is obviously a surprising rate as compared with that of the prior art.

EXAMPLE 2

A hot solution at 88°C is prepared by employing 430 kgs sucrose to every 100 liters water. A quantity of cognac, brandy or whisky is then added so that 100 kgs solution will contain 14 kgs ethyl alcohol. The saturation point of the resulting solution is at about 58°C. The solution is cooled down to −5°C in a manner similar to that disclosed in Example 1. The cool solution is fed to the tank of a conventional piston-type depositing machine kept at −5°C by means of a cooling jacket. Rows of preformed chocolate shells are intermittently caused to travel beneath the depositing machine nozzles and doses of solution measured by the piston pumps of the depositing machine are deposited thereinto. At the next station the deposited doses are sprayed with a thin layer of molten chocolate and at the next succeeding station the candies are sealed by the chocolate covers. The candies are packed in boxes and conditioned in a compartment at 15°C. In the conditioning compartment the boxes are turned upside down at first after 8 hours and next after further 12 hours. After 48 hours residence in the conditioning compartment under these conditions a microcrystalline crust is obtained which is uniformly thin and compact and fully insulates the solution from the surrounding chocolate.

The above examples are given to illustrate embodiments of the invention as it is presently preferred to practice it. It will be understood that these examples are illustrative, and the invention is not to be considered as restricted thereto except as indicated in the appended claims.

What we claim is:

1. In a method of making crust liqueurs by preparing a hot aqueous sugar solution, cooling the hot solution to below the melting point of chocolate thereby to supersaturate the solution, depositing the cool solution into preformed chocolate shells, and sealing the shells with a chocolate cover, the improvement comprising cooling the said hot solution in at least one cooling stage by causing the latter to flow in said stage in the form of an annular flow from an inlet end to the outlet end of a heat exchanger having at least one cooled smooth tubular surface surrounding said flow in contacting relationship thereto, and at the same time sweeping the solution over said tubular surface in a circumferential direction and in a continuous manner while positively defining said annular flow by a concentric rotor within said tube, then depositing the cooled supersaturated solution discharged at the said outlet end into the chocolate shells.

2. The method of claim 1, comprising sweeping the said tubular surface circumferentially by distinct annular zones in a cyclic sequence.

3. The method of claim 1, wherein the annular flow is produced by a hydraulic pressure of the solution delivered to the inlet end of the said tubular surface.

4. The method of claim 1, wherein said tubular surface is swept at a speed which will cause foaming of the solution.

5. The method of claim 1 carried out at a plurality of stages, wherein at least one stage following the first stage operates at a temperature below that of the first stage.

6. The method of claim 1 carried out at a plurality of stages, wherein at least one of the stages following the first stage operates at a sweeping speed below that of the first stage.

7. The method of claim 1, wherein the solution is cooled, before depositing, to a temperature which is at least 20°C below the saturation point of the solution.

8. The method of claim 1, wherein the solution is cooled to a temperature of from +5° to −10°C and depositing into the shells is effected at a temperature of the solution in this range.

9. The method according to claim 8, wherein the sealed crust liqueur is conditioned at a surrounding temperature of 10° to 20°C during a period of time sufficient for the solution sealed therein to separate sugar in form of crust on the inner surface of the shell and cover.

\* \* \* \* \*